(12) United States Patent
Bates et al.

(10) Patent No.: US 6,748,468 B1
(45) Date of Patent: Jun. 8, 2004

(54) CAPS LOCK NOTIFICATION

(75) Inventors: Cary L. Bates, Rochester, MN (US);
Gilford F. Martino, Endwell, NY (US);
John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/285,155

(22) Filed: Oct. 31, 2002

(51) Int. Cl.$^7$ .............................................. G06F 13/12
(52) U.S. Cl. ........................... 710/67; 710/62; 715/533; 340/635; 341/24
(58) Field of Search ...................... 710/62, 67; 707/533; 715/533; 340/635; 341/24

(56) References Cited

U.S. PATENT DOCUMENTS

| | | |
|---|---|---|
| 5,034,598 A | 7/1991 | Poland |
| 5,761,689 A * | 6/1998 | Rayson et al. ............... 715/533 |
| 5,856,785 A | 1/1999 | Bowie et al. |
| 6,047,300 A * | 4/2000 | Walfish et al. .............. 715/533 |
| 2003/0206157 A1 * | 11/2003 | Emerson ..................... 345/168 |

OTHER PUBLICATIONS

Online Word 7.0 Lessons, 1997, www.lgta.org/word7/word7.L6.all.htm.*
IBM Technical Disclosure Bulletin, May, 1, 1980, vol. 22, Issue 12, p. 5240, Method for Capitalization Checking During Spelling.*

* cited by examiner

*Primary Examiner*—Fritz Fleming
(74) *Attorney, Agent, or Firm*—Schmeiser, Olsen & Watts, LLP

(57) ABSTRACT

A Caps Lock notification method, system, mechanism, algorithm, and computer program product. A determination is made as to whether a Caps Lock key of a computer keyboard is in an error state, based on ascertaining whether a first condition has been satisfied. If it is so determined that the Caps Lock key is in an error state, then a signal is generated to communicate to a user at the computer keyboard that the Caps Lock key is in the error state. The signal may be a visual signal, an audible signal, a tactile signal, an auditory signal, or a combination thereof. Satisfaction of a second condition may be used to disable the signal.

20 Claims, 6 Drawing Sheets

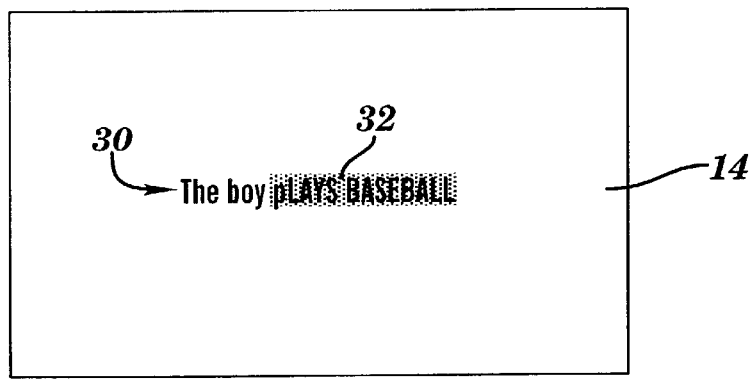
FIG. 5
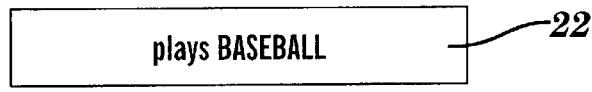
FIG. 6
EXAMPLES OF SUSPECTED TEXT AND ASSOCIATED CAPS LOCK ERROR STATE
| EXAMPLE | SUSPECTED TEXT | ERROR STATE |
|---|---|---|
| 1 | The gaME IS OVER | ON-ERROR STATE |
| 2 | I like this toy but not that TOY | ON-ERROR STATE |
| 3 | chicago is in Illinois | OFF-ERROR STATE |
| 4 | SQL is powerful and sql is easy to learn | OFF-ERROR STATE |
FIG. 7

EXAMPLES OF CONDITIONS FOR TURNING OFF SIGNAL

| EXAMPLE | CONDITION FOR TURNING OFF SIGNAL |
|---|---|
| 1 | ELAPSE OF A TIME INTERVAL |
| 2 | DEPRESSION OF A DESIGNATED KEY ON THE COMPUTER KEYBOARD |
| 3 | AT LEAST K KEY DEPRESSIONS ON THE COMPUTER KEYBOARD (K=3, 4, ...) |

CAPS LOCK NOTIFICATION

BACKGROUND OF THE INVENTION

1. Technical Field

The present invention relates to a method, system, mechanism, software code, and computer program product for Caps Lock notification.

2. Related Art

A Caps Lock key of a computer keyboard may be unintentionally activated, leading to errors in what is typed on the computer keyboard. Therefore, a method is needed for mitigating errors generated by unintentional activation of the Caps Lock key.

SUMMARY OF THE INVENTION

In first embodiments, the present invention provides a Caps Lock notification method, comprising:

determining that a Caps Lock key of a computer keyboard is in an error state, based on ascertaining that a first condition has been satisfied; and generating a signal in response to said determining.

In second embodiments, the present invention provides a Caps Lock notification system, comprising:

means for determining that a Caps Lock key of a computer keyboard is in an error state, based on ascertaining that a first condition has been satisfied; and means for generating a signal in response to said determining.

In third embodiments, the present invention provides a Caps Lock notification mechanism, comprising a signal communicating that a Caps Lock key of a computer keyboard is in an error state.

In fourth embodiments, the present invention provides a software code for Caps Lock notification, comprising an algorithm, said algorithm adapted to:

determine that a Caps Lock key of a computer keyboard is in an error state if a first condition has been satisfied; and cause generation of a signal if the algorithm so determines that the Caps Lock key is in the error state.

In fifth embodiments, the present invention provides a computer program product, comprising:

a computer usable medium having a computer readable program code embodied therein for controlling a Caps Lock key of a computer keyboard, wherein the computer readable program code comprises an algorithm adapted to:

determine that the Caps Lock key of a computer keyboard is in an error state if a first condition has been satisfied; and cause generation of a signal if the algorithm so determines that the Caps Lock key is in the error state.

The present invention mitigates errors generated by unintentional activation of the Caps Lock key of a computer keyboard.

BRIEF DESCRIPTION OF THE DRAWINGS

FIG. 5 depicts highlighting of text as an indication of a Caps Lock error state, in accordance with embodiments of the present invention.

FIG. 6 depicts suspected text relating to a Caps Lock error state, in accordance with embodiments of the present invention.

FIG. 7 depicts examples of suspected text and associated Caps Lock error states, in accordance with embodiments of the present invention.

DETAILED DESCRIPTION OF THE INVENTION

Figure 1:
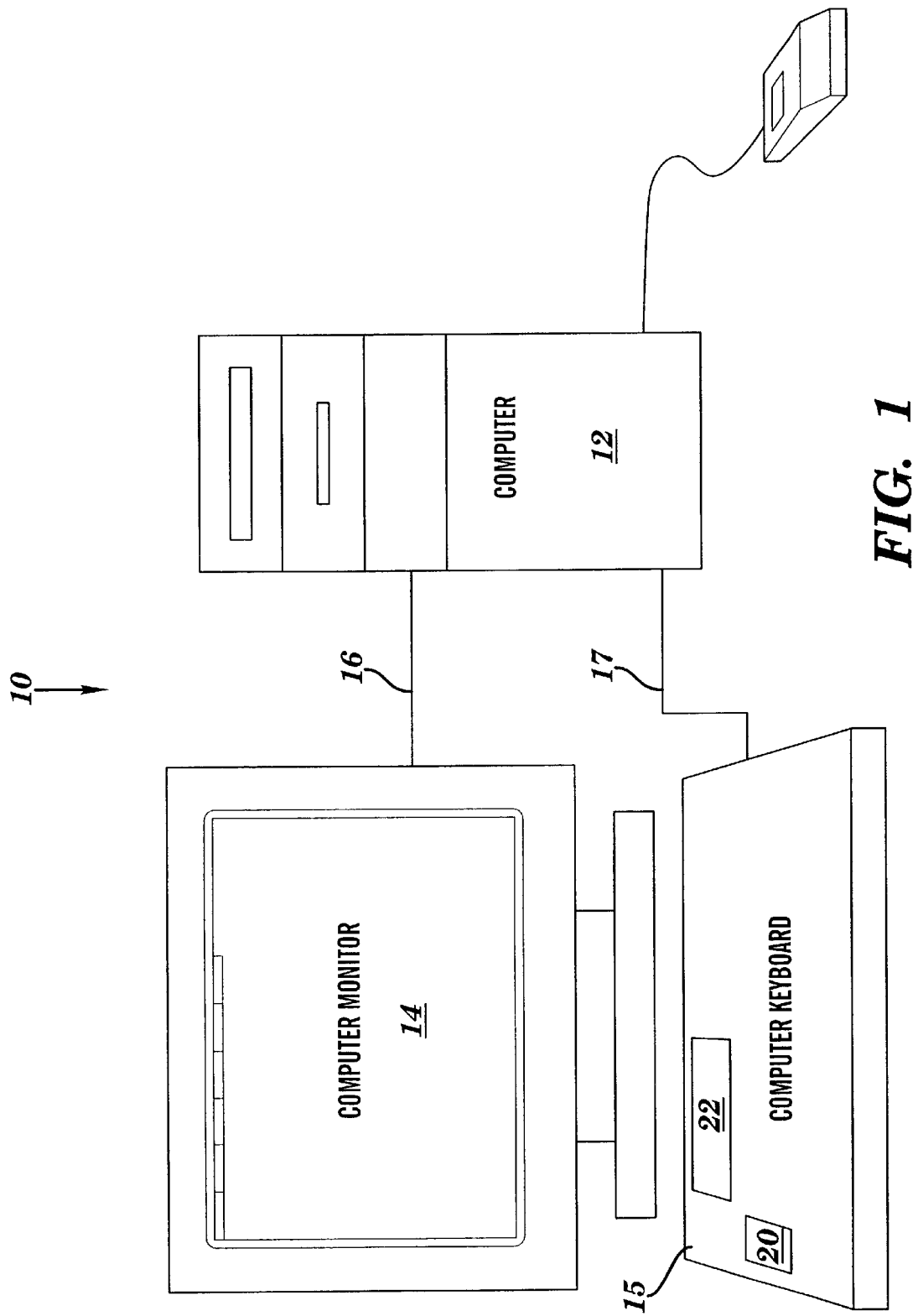
FIG. 1 is a computer system comprising a computer, a computer monitor, and a computer keyboard, in accordance with embodiments of the present invention.

FIG. 1 is a computer system 10 comprising a computer 12, a computer monitor 14, and a computer keyboard 15, in accordance with embodiments of the present invention. The computer 12 communicates with the computer monitor 14 via a communication path 16. The computer 12 communicates with the computer keyboard 15 via a communication path 17. The computer keyboard 15 comprises a Caps Lock key 20 and a Clear key 22. As will be discussed infra, computer software running on the computer 12 may determine that the Caps Lock key 20 of the computer keyboard 15 is in an error state such that the Caps Lock key 20 is ON when the Caps Lock key 20 should be OFF, or such that the Caps Lock key 20 is OFF when the Caps Lock key 20 should be ON. If said computer software determines that the Caps Lock key 20 is in such an error state, then the computer software may trigger generation of a signal that serves to communicate to a computer user logged on the computer system 10 that the Caps Lock key 20 is in such an error state. The signal, exemplified by signal 18 in FIGS. 3 and 4, will be described infra in more detail.

Figure 2:
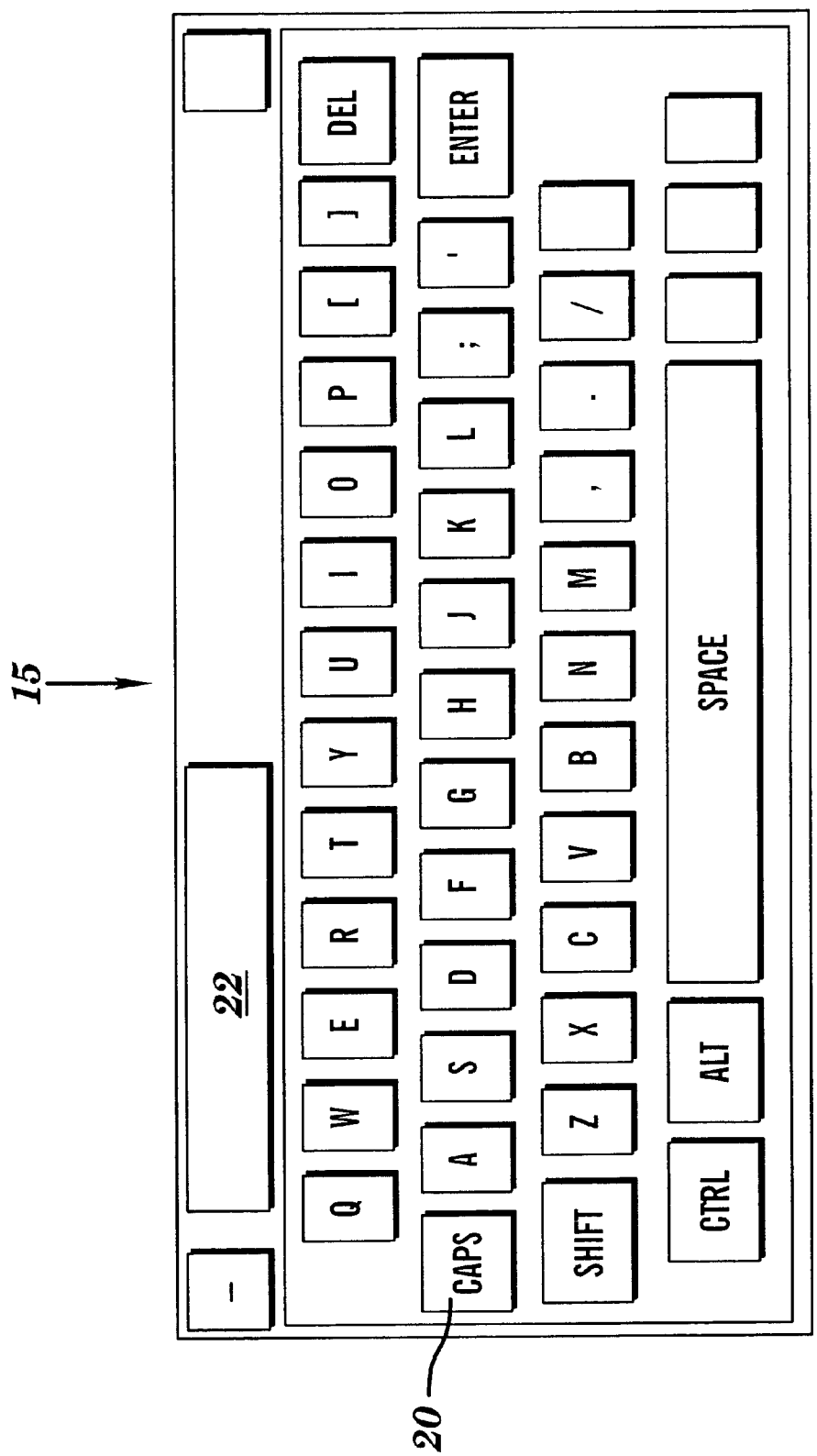
FIG. 2 depicts a more detailed view of the computer keyboard of FIG. 1, in accordance with embodiments of the present invention.

FIG. 2 depicts a more detailed view of the computer keyboard 15 of FIG. 1, in accordance with embodiments of the present invention. The computer keyboard 15 includes the Caps Lock key 20 and the Clear key 22, as well as other keys typically present on a computer keyboard. Other keys typically present on as computer keyboard, such as function keys F1, F2, . . . , are not shown on the computer keyboard 15 but may nevertheless be present. The particular keys present on, and absent from, the computer keyboard 15, and their geometric and positional relationships, are merely illustrative. Accordingly, the scope of the present invention includes any computer keyboard that contains a Caps Lock key.

The Caps Lock key 22 may be toggled between an OFF state and an ON state, by being depressed or tapped. When the Caps Lock key 22 is OFF (i.e., in the OFF state), depression of a letter key (e.g., A, B, or C) on the computer keyboard 15 (see FIG. 1) causes a lower case version of the associated letter (e.g., a, b, or c) to be typed. When the Caps Lock key 22 is ON (i.e., in the ON state), depression of a letter key on the computer keyboard 15 causes an upper case version of the associated letter (e.g., A, B, or C) to be typed.

The Caps Lock key 20 may be in an error state such that the Caps Lock key 20 is ON when the Caps Lock key 20 should be OFF, or such that the Caps Lock key 20 is OFF when the Caps Lock key 20 should be ON. A common example is where the computer user turned the Caps Lock key 20 ON to enable typing a Capital letter as the first character of a sentence, but erroneously neglected to turn the Caps Lock key 20 OFF immediately following said typing of the first character of the sentence. The Caps Lock key 20 is in an ON-error state when the Caps Lock key 20 is ON but should be OFF. The Caps Lock key 20 is in an OFF-error state when the Caps Lock key 20 is OFF but should be ON. A Caps Lock error state exists if one or more conditions are satisfied. Such conditions typically involves "suspected text"; i.e., configurations of upper case and lower case letters that had been typed on the computer keyboard 15. Examples of such conditions (e.g., conditions involving "suspected text") will be discussed infra in conjunction with FIG. 5–7. Accordingly, such conditions may relate to placement of at least one letter (i.e., an upper-case letter or a lower-case letter) within the suspected text. Such conditions are software-specific and different implementations of the present invention will have different such conditions. If computer software implementing the present invention determines that a Caps Lock error exists, then the computer software may trigger the computer 12 to generate a signal, such as the signal 18 of FIGS. 3 and 4, that serves to communicate to a computer user logged on the computer system 10 (see FIG. 1) that the Caps Lock key 20 is in said error state. If said computer software determines that said Caps Lock error exists, then the computer user may make-beneficial use of such knowledge learned through said signal. For example, the computer user my depresses the Caps Lock key 20 to take the Caps Lock key 20 out of the error state. Alternatively, if said computer software determines that said Caps Lock error exists, then the computer user may disagree and ignore or disable said signal.

Figure 3:
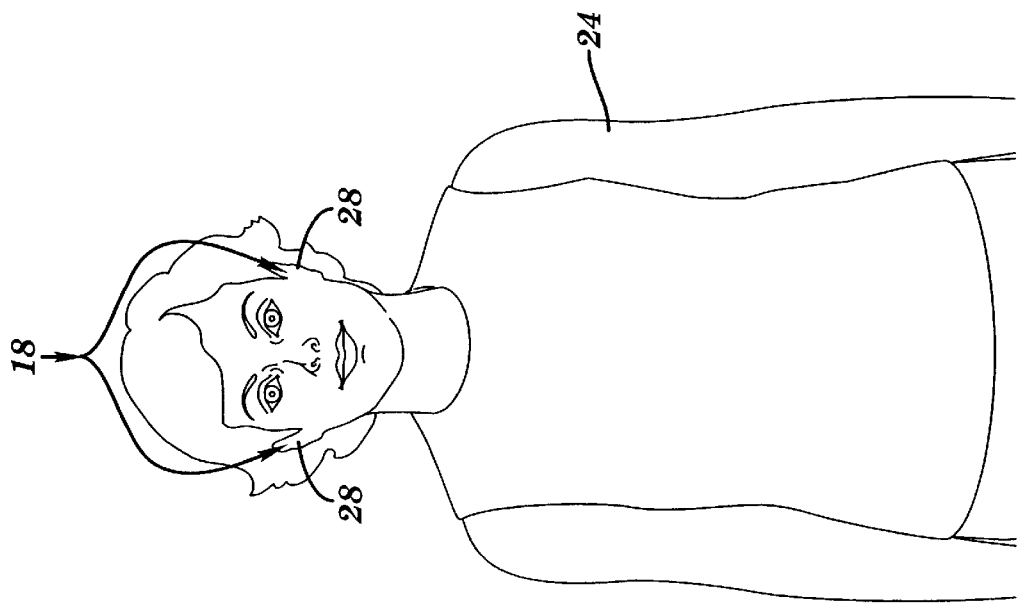
FIG. 3 depicts a visual signal from the computer system of FIG. 1, in accordance with embodiments of the present invention.
Figure 4:
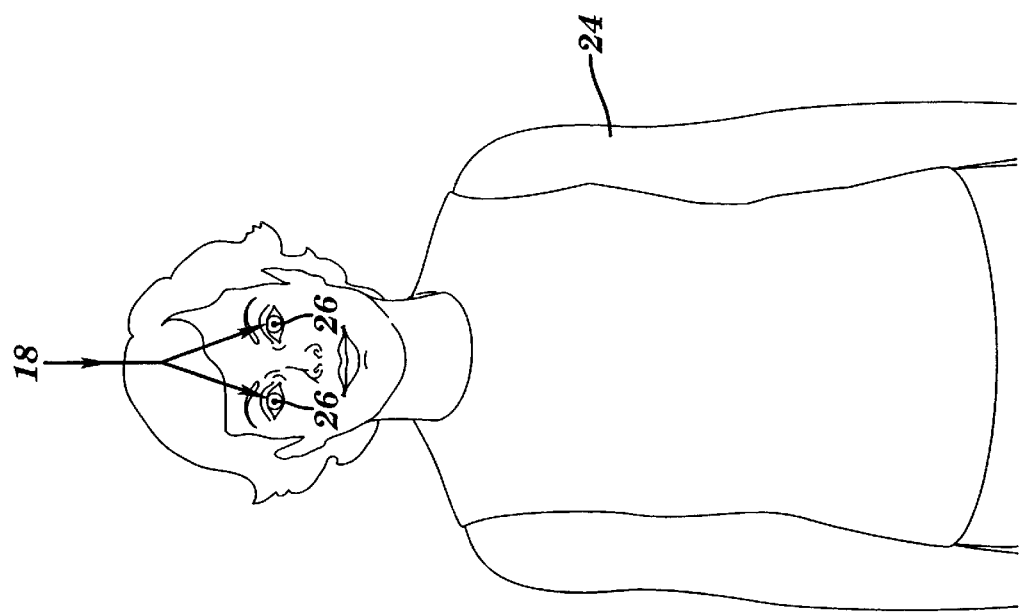
FIG. 4 depicts an audible signal from the computer system of FIG. 1, in accordance with embodiments of the present invention.

The signal, such as the signal 18 of FIGS. 3 and 4, comprises any signal modality (e.g., visual, auditory, tactile, olfactory) such that said signal communicates to the computer user logged on the computer system 10 that the Caps Lock key 20 is in an error state. As shown in FIG. 3, the signal 18 may comprise a visual signal adapted to be seen through the eyes 26 of a computer user 24. For example, the visual signal may comprise highlighting a portion of the suspected text on the screen of the computer monitor 14. FIG. 5 illustrates suspected text 30 (i.e., "The boy pLAYS BASEBALL") and a highlighted portion 32 thereof. In another example as illustrated in FIG. 6, the visual signal may comprise displaying the portion 32 of the suspected text 30 in the Clear Key 22 of the computer keyboard 15 (see FIG. 2). The Clear Key 22 may comprise, inter alia, a Light Emitting Diode (LED) having one or more rows of characters.

As shown in FIG. 4, the signal 18 may also comprise an audible signal adapted to be heard through the ears 28 of the computer user 24. The audible sound may comprises any type of sound (e.g., a beep, a buzz, a musical sound, a scream, a cry, etc.) and any sound characteristic (e.g. pitch, loudness, etc.), and any combination of sound types and sound characteristics. The sound's pitch may be constant or variable, and the sound's loudness may be constant or variable. The audible signal may be generated under direction of an algorithm executed by the computer 12 of FIG. 1 through, inter alia, use of a sound card installed in the computer 12.

Further, the signal may comprise a tactile signal such as by, inter alia, having the keyboard vibrate such that said vibration is transmitted to a finger of the computer user as said finger is touching a key of the computer keyboard 15. Additionally, the signal may comprise an olfactory signal such as by, inter alia, having a device coupled to the computer 12 emit a gas that has a smell or aroma. Note that the signal may include any of the signal modalities described supra, or a combination thereof (e.g., both a visual signal and an audible signal).

FIG. 7 depicts examples of "suspected text" and associated Caps Lock error states, in accordance with embodiments of the present invention. In FIG. 7, examples 1 and 2 are each associated with an ON-error state, and examples 3 and 4 are each associated with an OFF-error state. Example 1 illustrates an ON-error state occurring if an upper-case letter is immediately follows a lower-case letter or a number (i.e., "aM"). Example 2 illustrates an ON-error state occurring if an upper-case word within the suspected text comprises at least two upper-case letters, and the upper-case word has been previously typed in lower case (i.e., "toy" preceding "TOY"). Example 3 illustrates an OFF-error state occurring if a lower-case letter (i.e., "c") is the first character of a sentence. Example 4 illustrates an OFF-error state occurring if a lower case word within the suspected text comprises at least two lower-case letters, and the lower case word has been previously typed in upper case (i.e., "SQL" preceding "sql"). Additionally, a dictionary could be used to determine whether a word is a proper noun, in light of the fact that a proper noun should begin with an upper-case letter.

Figure 8:
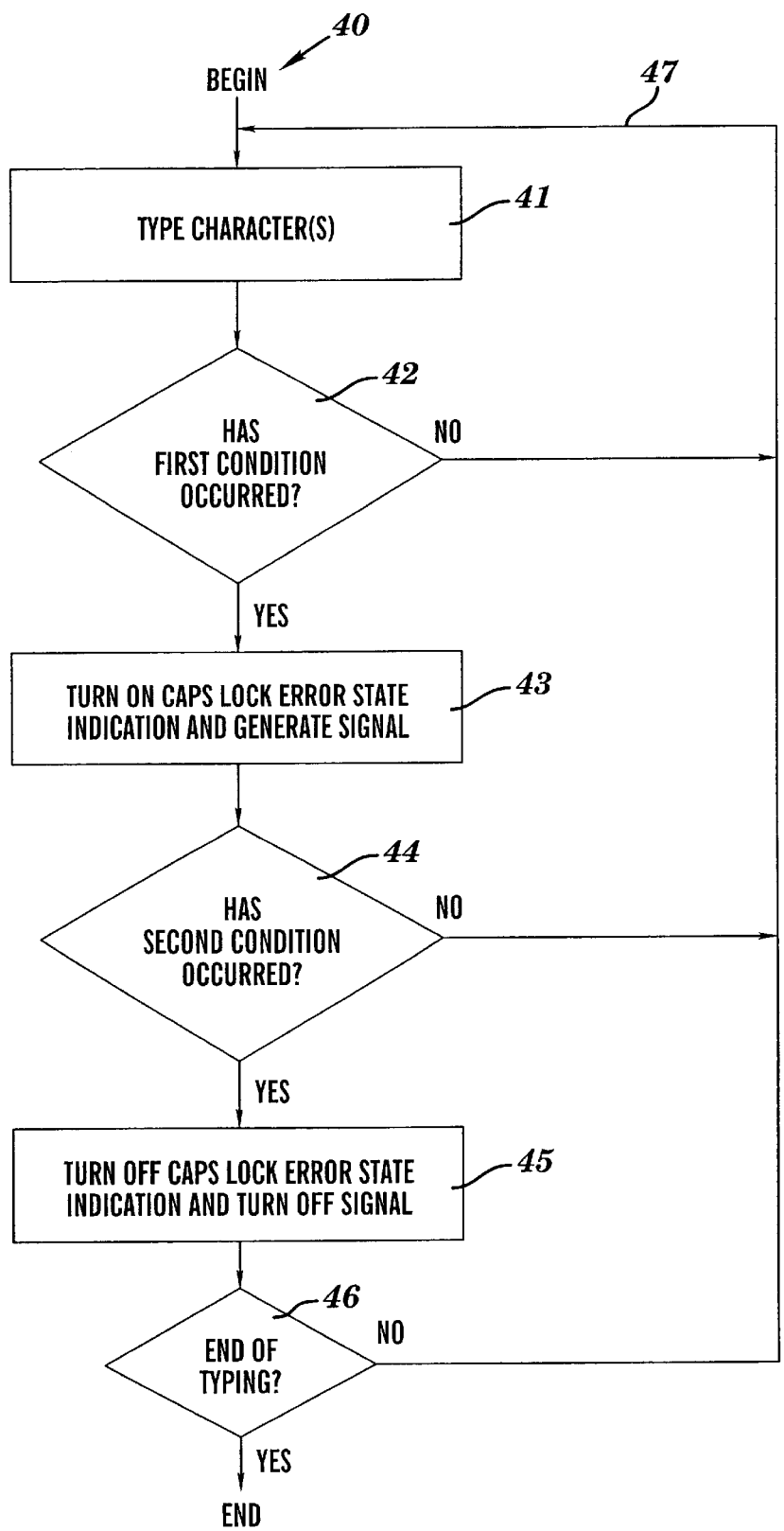
FIG. 8 is a flow chart depicting an algorithm for processing a Caps Lock error state, in accordance with embodiments of the present invention.

FIG. 8 is a flow chart depicting an algorithm 40 for processing a Caps Lock error state, in accordance with embodiments of the present invention. The algorithm 40 may be hard-coded into a computer or computer chip. Alternatively, the algorithm 40 may implemented in software that is executed by a processor of the computer 12 in FIG. 1. In step 41, one or more characters are typed on the computer keyboard 15 of FIG. 1. Step 42 determines whether a Caps Error state exists, by testing whether a first condition has occurred. The error state may be either an ON-error state or an OFF-error state. The first condition comprises one or more conditions, such as conditions involving "suspected text" as discussed supra in conjunction with FIG. 7. Said first condition may be fixed such as being hard-coded or similarly encoded within software, or alternatively said first condition may vary (e.g., the first condition may be job-dependent such as where the user chooses the first condition from a menu of first condition alternatives). If step 42 determines that said first condition has not occurred then there is no existing Caps Lock error state, and program control returns to step 41 through an iteration loop 47 as shown. If step 42 determines that said first condition has occurred then a Caps Lock error state exists, and step 43 is next executed.

Step 43 turns on a Caps Lock error state indication such as, inter alia, setting a flag or a variable. Additionally, step 43 generates a signal, such as the signal 18 of FIGS. 3 and 4, so as to communicate to the computer user logged on the computer system 10 that the Caps Lock key 20 is in an error state. If step 42 the algorithm 40 has identified, such as in step 42, "suspected text" that is a basis for the detected Caps Lock error state, then step 43 may additionally store such suspected text in a buffer so that said suspected text can be subsequently retrieved and used to correct text that includes errors stemming from said Caps Lock error state. Examples of suspected text were presented and discussed supra in conjunction with FIG. 7. Said buffer may comprise any storage such as memory devices 94 and 95 of the computer system 90 of FIG. 10, described infra.

Figures 9, 10:
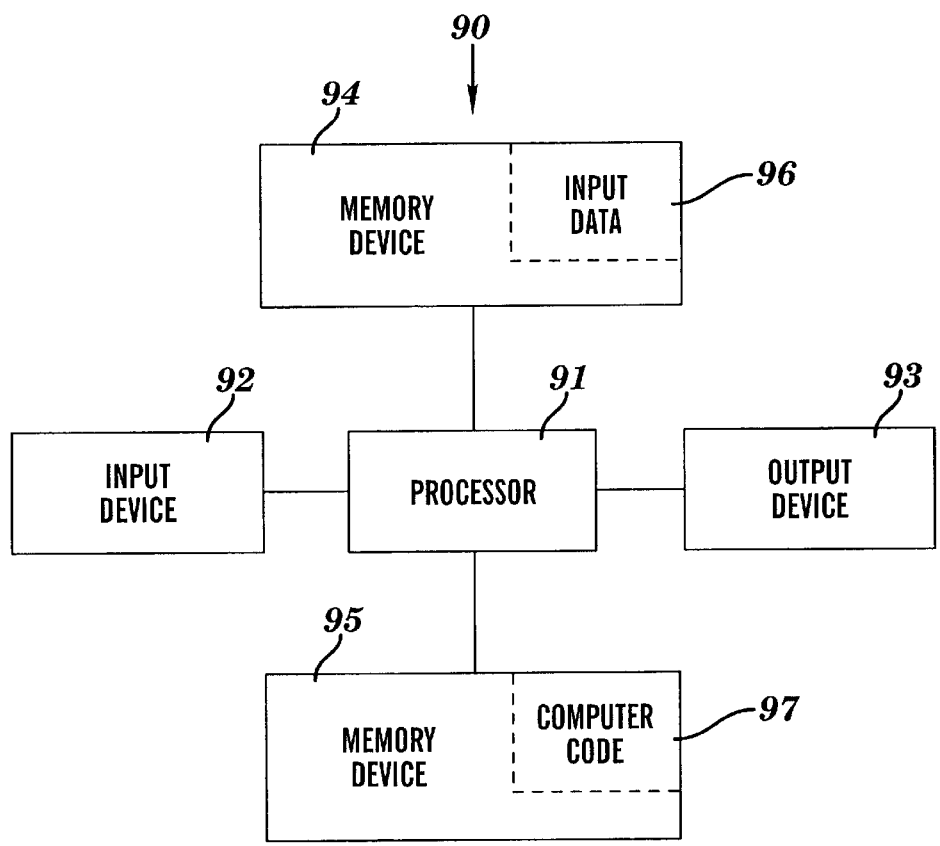
FIG. 9 depicts examples of conditions for turning off a signal that indicates a Caps Lock error state.
FIG. 10 depicts a computer system for processing a Caps Lock error state, in accordance with embodiments of the present invention.

Next in step 44 the algorithm 40 determines whether to disable (i.e., turn off) the Caps Lock error state indication as well as the signal generated in step 43, by testing whether a second condition has occurred. As shown in FIG. 10, the second condition comprises one or more conditions such as, inter alia:

- elapse of a time interval not less than one second (e.g., 1 second, 2 seconds, 5 seconds, 10 seconds, 30 seconds, 60 seconds, etc.);
- depression of a designated key of the computer keyboard 15 of FIG. 1 such as the Caps Lock key 20 or any other key; or
- at least K key depressions on the computer keyboard such that K=2, 3, 4, or any other positive integer.

Said second condition may be fixed such as being hard-coded or similarly encoded within software, or alternatively said second condition may vary (e.g., the second condition may be job-dependent such as where the user chooses the second condition from a menu of second condition alternatives). If step 44 determines that said second condition has not occurred then program control returns to step 41 through the iteration loop 47. If step 44 determines that said second condition has occurred then step 45 is next executed. Step 45 turns off the Caps Lock error state indication and also disables (i.e., turns off) the signal generated in step 43, followed by a determination (in step 46) of whether typing on the computer keyboard 15 has ended. If said typing has not ended, then program control returns to step 41 through the iteration loop 47. If said typing has ended, then the algorithm 40 ends.

FIG. 10 depicts a computer system 90 for processing a Caps Lock error state, in accordance with embodiments of the present invention. The computer system 90 is analogous to the computer system 10 of FIG. 1. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The input device 94 and 95 may be, inter alia, a hard disk, a dynamic random access memory (DRAM), a read-only memory (ROM), etc. The memory device 95 includes a computer code 97. The computer code 97 includes an algorithm (e.g., the algorithm 40 of FIG. 8) for processing the Caps Lock error state. The processor 91 executes the computer code 97. The memory device 94 includes input data 96. The input data 96 includes input required by the computer code 97. The output device 93 displays output from the computer code 97.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A Caps Lock notification method, comprising:
   determining that a Caps Lock key of a computer keyboard is in an error state, based on determining that a first condition has been satisfied;
   generating an error signal in response to the determining that the Caps Lock key is in the error state;
   ascertaining whether a second condition has occurred after the generating; and
   if said ascertaining has ascertained that the second condition has occurred then disabling the error signal in response to said ascertaining without changing the error state.

2. The method of claim 1, wherein the error state is an ON-error state.

3. The method of claim 1, wherein the error state is an OFF-state.

4. The method of claim 1, wherein the error signal comprises an audible signal.

5. The method of claim 1, wherein the error signal comprises a visual signal.

6. The method of claim 1, further comprising:
   identifying suspected text that has been typed on the computer keyboard while the Caps Lock key is in the error state, and
   displaying the suspected text in a clear key of a computer keyboard.

7. The method of claim 1, further comprising:
   identifying suspected text that has been typed on the computer keyboard while the Caps Lock key is in the error state, and
   highlighting the suspected text on a screen of a computer monitor that is operatively coupled to the keyboard by a processor.

8. The method of claim 1, wherein the first condition is satisfied if an upper-case letter is immediately follows a character that is selected from the group consisting of a lower-case letter and a number.

9. The method of claim 1, wherein the first condition is satisfied if a word has been ascertained to have been typed in a different case.

10. The method of claim 9, wherein the first condition is satisfied if an upper-case word has been ascertained to have been previously typed in a lower case.

11. The method of claim 9, wherein the first condition is satisfied if a lower-case word has been ascertained to have been previously typed in an upper case.

12. The method of claim 1, wherein the second condition comprises an elapse of a time interval not less than a second.

13. The method of claim 1, wherein the second condition comprises depression of a designated key of the computer keyboard.

14. The method of claim 13, wherein the designated key is the Caps lock key.

15. The method of claim 13, wherein the designated key is not the Caps Lock key.

16. The method of claim 1, wherein the second condition comprises at least three key depressions on the computer keyboard.

17. A computer program product comprising:
   a computer usable medium having a computer readable program code embodied therein for controlling a Caps Lock error state, wherein the computer readable program code comprises an algorithm adapted to:
   determine that a Caps lock key of a computer keyboard is in an error state, based on determining that a first condition has been satisfied;

cause generation of an error signal if the algorithm so determines that the Caps Lock key is in the error state;

ascertain whether a second condition has occurred after the generation of the error signal; and disable the error signal without changing the error state in response to having ascertained that the second condition has occurred.

18. The computer program product of claim 17, wherein the second condition is selected from the group consisting of depression of a designated key of the computer keyboard, an elapse of a time interval not less than one second, and at least three key depressions on the computer keyboard.

19. The computer program product of claim 17, wherein the error signal comprises an audible signal.

20. The computer program product of claim 17, wherein the error signal comprises a visual signal.

* * * * *